(12) United States Patent
Teragawa (10) Patent No.: US 9,563,005 B2
(45) Date of Patent: Feb. 7, 2017

(54) LIGHT SOURCE DEVICE, DISPLAY APPARATUS, AND METHOD OF MANUFACTURING LIGHT SOURCE DEVICE

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/431,491

(22) PCT Filed: Mar. 11, 2014

(86) PCT No.: PCT/JP2014/056359
§ 371 (c)(1),
(2) Date: Mar. 26, 2015

(87) PCT Pub. No.: WO2015/136625
PCT Pub. Date: Sep. 17, 2015

(65) Prior Publication Data
US 2016/0109643 A1    Apr. 21, 2016

(51) Int. Cl.
*F21V 7/04* (2006.01)
*F21V 8/00* (2006.01)
*F21S 2/00* (2016.01)

(52) U.S. Cl.
CPC ........... *G02B 6/0058* (2013.01); *G02B 6/0043* (2013.01); *G02B 6/0055* (2013.01); *G02B 6/0061* (2013.01); *G02B 6/0065* (2013.01); *F21S 2/00* (2013.01); *G02B 6/0056* (2013.01); *G02B 6/0063* (2013.01)

(58) Field of Classification Search
CPC ... G02B 6/0056; G02B 6/0058; G02B 6/0043; G02B 6/0065; G02B 6/0033; G02B 6/0031; G02B 6/004; G02B 6/0061; G02B 6/0063; F21S 2/00
See application file for complete search history.

(56) References Cited

U.S. PATENT DOCUMENTS

| 2011/0170289 A1* | 7/2011 | Allen | F21K 9/50 362/235 |
| 2011/0182054 A1* | 7/2011 | Lee et al. | H01L 25/0753 362/84 |
| 2012/0014092 A1* | 1/2012 | Lee et al. | G02B 6/0068 362/97.1 |

FOREIGN PATENT DOCUMENTS

| JP | 10-062626 | 3/1998 |
| JP | 2013-093195 | 5/2013 |

* cited by examiner

*Primary Examiner* — Y M Lee
(74) *Attorney, Agent, or Firm* — Rudy J. Ng; Bret E. Field; Bozicevic, Field & Francis LLP (57) ABSTRACT

Provided are a light source device capable of uniformly illuminating, a display apparatus, and a method of manufacturing the light source device. Since a reflection sheet is adhered to a light guide plate through an adhesive layer, deflection thereof is suppressed. Since dot parts are filled in openings of an optical layer, it would be difficult for the dot parts to be distorted by an outer force. In addition, since the dot parts are formed by forming the optical layer and the adhesive layer in a large area in which an occurrence of distortion during forming is minimal, it would be difficult for the dot parts to be distorted during forming the same. Therefore, an occurrence of luminance unevenness caused by the deflection of the reflection sheet or the distortion of the dot parts may be suppressed. From the above result, it is possible to uniformly illuminate by the light source device.

10 Claims, 6 Drawing Sheets

LIGHT SOURCE DEVICE, DISPLAY APPARATUS, AND METHOD OF MANUFACTURING LIGHT SOURCE DEVICE

CROSS-REFERENCE TO RELATED APPLICATIONS

This application is the national phase under 35 U. S. C. §371 of PCT International Application No. PCT/JP2014/056359 which has an International filing date of Mar. 11, 2014 and designated the United States of America.

FIELD

The present invention relates to a light source device which emits light emitted by a light source from a light guide plate, a display apparatus, and a method of manufacturing the light source device.

BACKGROUND

A liquid crystal display apparatus includes a liquid crystal display panel which has a display surface on a front side, and a backlight which illuminates the liquid crystal display panel from a back side of the liquid crystal display panel.

Hereinafter, an example in which the liquid crystal display panel is disposed in a vertical position will be described.

Conventionally, an edge light type backlight has been proposed. The edge light type backlight includes a rectangular light guide plate disposed in a vertical position on the back side of the liquid crystal display panel, and a light source unit disposed to face a lower end face of the light guide plate.

Light emitted by the light source unit is transmitted through the lower end face of the light guide plate, and made incident inside of the light guide plate, and further emitted to the front side of the light guide plate from a front surface of the light guide plate. As a result, the light guide plate performs a surface emitting.

By the surface emitting of the light guide plate, the liquid crystal display panel is illuminated from the back side. When the surface emitting of the light guide plate is uniform, the display surface of the liquid crystal display panel is uniformly lightened.

In order to guide the light incident inside of the light guide plate to the front side of the light guide plate, a reflection sheet is disposed on the back side of the light guide plate through an air layer. In addition, a plurality of light scattering dots are formed on a rear surface of the light guide plate. An area of each light scattering dot disposed near the light source unit is small, and the area of each light scattering dot disposed away from the light source unit is large.

The light transmitted through the rear surface of the light guide plate and made incident to the light scattering dot is scattered to the front side.

The light transmitted through the rear surface of the light guide plate and made incident to the air layer is reflected to the front side. The reason is that, since the refractive index of the air layer is lower than the refractive index of the light guide plate, a total reflection to the front side may occur at a boundary portion between the light guide plate and the air layer. In addition, the reason is also that the light transmitted through the air layer is reflected to the front side by the reflection sheet.

Preferably, the reflection sheet is adhered to the light guide plate. The reason is that, when the reflection sheet is not adhered to the light guide plate, the reflection sheet may be deflected due to a thermal expansion, for example.

If the reflection sheet is deflected, the surface emitting of the light guide plate becomes uneven (so-called brightness unevenness is generated). As a result, display quality is deteriorated.

In addition, a surface light emitting device including a plurality of light scattering dots with adhesiveness formed on the rear surface of the light guide plate has been proposed (see Japanese Patent Application Laid-Open No. 2013-93195).

In the case of a first surface light emitting device described in Japanese Patent Application Laid-Open No. 2013-93195, the reflection sheet is adhered to the light guide plate through the light scattering dots. An air layer is present between the light scattering dots.

In the case of a second surface light emitting device described in Japanese Patent Application Laid-Open No. 2013-93195, the light scattering dots and the rear surface of the light guide plate exposed between the light scattering dots are covered with a low refractive index layer. The rear surface of the low refractive index layer is covered with an adhesive layer. The reflection sheet is adhered to the light guide plate through the adhesive layer.

All the first and second surface light emitting devices described in Japanese Patent Application Laid-Open No. 2013-93195 satisfy both of that the reflection sheet is adhered to the light guide plate and that a layer having a lower light refractive index than the light guide plate comes into close contact to the rear surface of the light guide plate.

If a layer having the light refractive index higher than the light refractive index of the light guide plate comes into close contact to the rear surface of the light guide plate, it would be difficult for the light to be totally reflected at the boundary portion between the layer and the light guide plate. Therefore, light-guiding efficiency to the front side of the light guide plate is deteriorated.

SUMMARY

In the case of the first surface light emitting device described in Japanese Patent Application Laid-Open No. 2013-93195, the area of the rear surface of the light guide plate is larger than a total area of the light scattering dots. Therefore, the reflection sheet may be easily peeled off from the light guide plate.

Further, in the case of the first surface light emitting device, the light scattering dots may be unnecessarily distorted. The reason is that the light scattering dots are likely to be sandwiched and crushed between the light guide plate and the reflection sheet.

In the case of the second surface light emitting device described in Japanese Patent Application Laid-Open No. 2013-93195, the area of the adhesive layer is approximately equal to the area of the rear surface of the light guide plate. Therefore, it would be difficult for the reflection sheet to be peeled off from the light guide plate.

In addition, as much as the light scattering dot is protected by being covered with the low refractive index layer, it would be difficult for the light scattering dot to be distorted even when it is sandwiched between the light guide plate and the reflection sheet.

The light scattering dots are printed on the rear surface of the light guide plate by screen printing, inkjet printing or the like. However, when printing the light scattering dots having a small area, the light scattering dots may be easily distorted. Further, in the screen printing, due to unwanted deformation (so-called mesh crush) of a screen plate by repeated printings, distorted light scattering dots may be easily printed.

Therefore, when the area of the light scattering dots is large, distortion of the light scattering dots due to the printing (in particular, screen printing) is negligibly small, however, when the area of the light scattering dots is small, the distortion thereof is too large to ignore.

The large distortion of the light scattering dots causes an occurrence of luminance unevenness to deteriorate display quality. However, the distortion of the light scattering dots due to the printing cannot be solved by both of the first and second surface light emitting devices.

In consideration of the above-mentioned circumstances, it is a major object of the present invention to provide a light source device capable of uniformly illuminating, a display apparatus, and a method of manufacturing the light source device.

According to one aspect of the present invention, there is provided a light source device which includes a reflection sheet having light reflecting properties, and a light guide plate in which the reflection sheet is disposed on a side of one surface thereof and which is configured to emit light emitted by a light source unit from the other surface thereof, including: an optical layer which is formed on the one surface, provided with openings, and configured to guide the light incident on the one surface to a side of the other surface; and an adhesive layer which is formed on a surface of the side of the one surface of the optical layer and the one surface which is exposed from the openings, and has light scattering properties or light reflecting properties, wherein the reflection sheet is adhered to the light guide plate through the adhesive layer.

In the light source device according to the present invention, the optical layer has a lower light refractive index than the light guide plate.

In the light source device according to the present invention, the optical layer has light reflecting properties.

According to another aspect of the present invention, there is provided display apparatus including: the light source device according to the present invention; and a display panel which is illuminated from a back side thereof by the light source device.

According to another aspect of the present invention, there is provided a method of manufacturing the light source device which includes a reflection sheet having light reflecting properties, and a light guide plate in which the reflection sheet is disposed on a side of one surface thereof and which is configured to emit light emitted by a light source unit from the other surface thereof, including the processes of: forming an optical layer, which is provided with openings, and configured to guide the light incident on the one surface to a side of the other surface, on the one surface; forming an adhesive layer, which has light scattering properties or light reflecting properties, on a surface of the side of the one surface of the optical layer and the one surface which is exposed from the openings; and adhering the reflection sheet to the light guide plate through the adhesive layer.

In the method of manufacturing the light source device according to the present invention, the optical layer is formed by printing.

In the present invention, the reflection sheet is adhered to the light guide plate through the adhesive layer. Therefore, it would be difficult for the reflection sheet to be deflected.

Hereinafter, one surface side (a side on which the reflection sheet is disposed) of the light guide plate and the other surface side (an emitting light side) is referred to as a back side and a front side, respectively.

The area of the back side of the adhesive layer can be approximately equal to the area of one surface of the light guide plate. In this case, it would be difficult for the reflection sheet to be peeled off from the light guide plate.

The adhesive layer has light scattering properties. Therefore, portions (i.e., the adhesive layer filled in the openings of the optical layer) formed on the one surface of the light guide plate which is exposed from the openings of the optical layer in the adhesive layer, play the same role as the conventional light scattering dots. Hereinafter, the portions are referred to as dot parts. Light incident to the dot parts is guided to the front side by scattering.

The adhesive layer may have light reflecting properties instead of light scattering properties. In this case, the light incident to the dot parts is guided to the front side.

The optical layer is present between the dot parts. Therefore, the light, which is transmitted through portions in which the dot part is not formed and made incident to the optical layer, is guided to the front side. Briefly, the optical layer corresponds to the air layer or the low refractive index layer.

The dot parts are filled in the openings of the optical layer. Therefore, distortion of the dot parts caused by being sandwiched between the light guide plate and the reflection sheet is suppressed.

It is preferable that the light source device as described above is used to configure the display apparatus as the backlight for illuminating the display panel.

In addition, the light source device as described above can be manufactured by the method of manufacturing the light source device according to the present invention.

In this case, first, the optical layer having the openings is formed on one surface of the light guide plate by a worker. Next, by the worker, the adhesive layer is formed on the surface of the back side in the optical layer, and the portion which is exposed from the openings of the optical layer in the one surface of the light guide plate. Then, by the worker, the reflection sheet is adhered to the light guide plate through the adhesive layer.

The dot parts are naturally formed during forming the adhesive layer. In other words, the dot parts having a small area are not formed as a single body, such that the adhesive layer having a large area is formed. Therefore, it would be difficult for the adhesive layer (and the dot parts) to be distorted during forming the same.

The case in which the dot parts are distorted is the case in which the peripheral edge parts of the openings of the optical layer are distorted. However, the area of the optical layer is sufficiently larger than the conventional individual light scattering dots, for example. Therefore, it would be difficult for the optical layer (and the peripheral edge parts of the openings) to be distorted during forming the same.

From the above result, even when the dot parts have a small area, distortion of the dot parts is suppressed. Therefore, the optical layer can be easily formed by printing.

In the present invention, the light incident to the optical layer is likely to be reflected to the front side at a boundary portion between the light guide plate and the optical layer. The reason is that, the optical layer has a lower light refractive index than the light guide plate. Briefly, the optical layer plays the same role as the conventional air layer or the low light refractive index layer.

In the present invention, when the optical layer has reflecting properties for partially reflecting, the light incident to the optical layer is likely to be reflected to the front side, similar to the case of the conventional air layer or the low light refractive index layer. When the optical layer has reflecting properties for totally reflecting, the light incident to the optical layer is efficiently reflected to the front side, compared to the case of the conventional air layer or the low light refractive index layer.

According to the light source device and the method of manufacturing the light source device of the present invention, the light incident to the dot parts or the optical layer is guided to the front side. Therefore, light-guiding efficiency form the light source unit to the front side of the light guide plate can be improved.

In addition, the deflection of the reflection sheet and the distortion of the dot parts can be suppressed. Therefore, an occurrence of luminance unevenness can be suppressed.

From the above result, the light source device can efficiently and uniformly illuminate.

Accordingly, the display apparatus of the present invention (that is, the display apparatus including the light source device of the present invention) can improve display quality. The above and further objects and features will more fully be apparent from the following detailed description with accompanying drawings.

DETAILED DESCRIPTION

Hereinafter, the present invention will be described in detail with reference to the accompanying drawings illustrating embodiments thereof. In the following description, up and low, front and rear, and left and right illustrated by arrows will be used.

Embodiment 1

Figure 1:
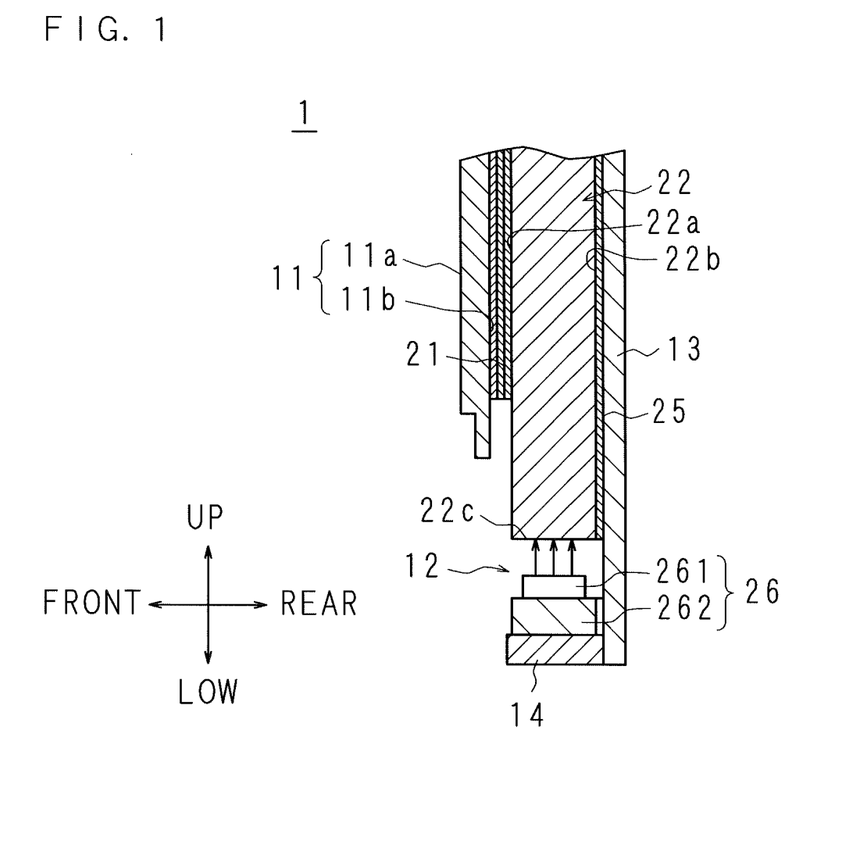
FIG. 1 is a longitudinal-sectional view schematically illustrating a configuration of a display apparatus according to Embodiment 1 of the present invention.

FIG. 1 is a longitudinal-sectional view schematically illustrating a configuration of a display apparatus 1 according to Embodiment 1 of the present invention.

The display apparatus 1 is constituted as, for example, a television receiver, a digital signage, a monitor for personal computer, or the like.

The display apparatus 1 includes a display panel 11, a backlight (light source device) 12, a backlight chassis 13, a heat sink 14, a cabinet (not illustrated) which houses these components in the state that a display surface 11a to be described below is exposed to an outside, and the like.

Figure 2:
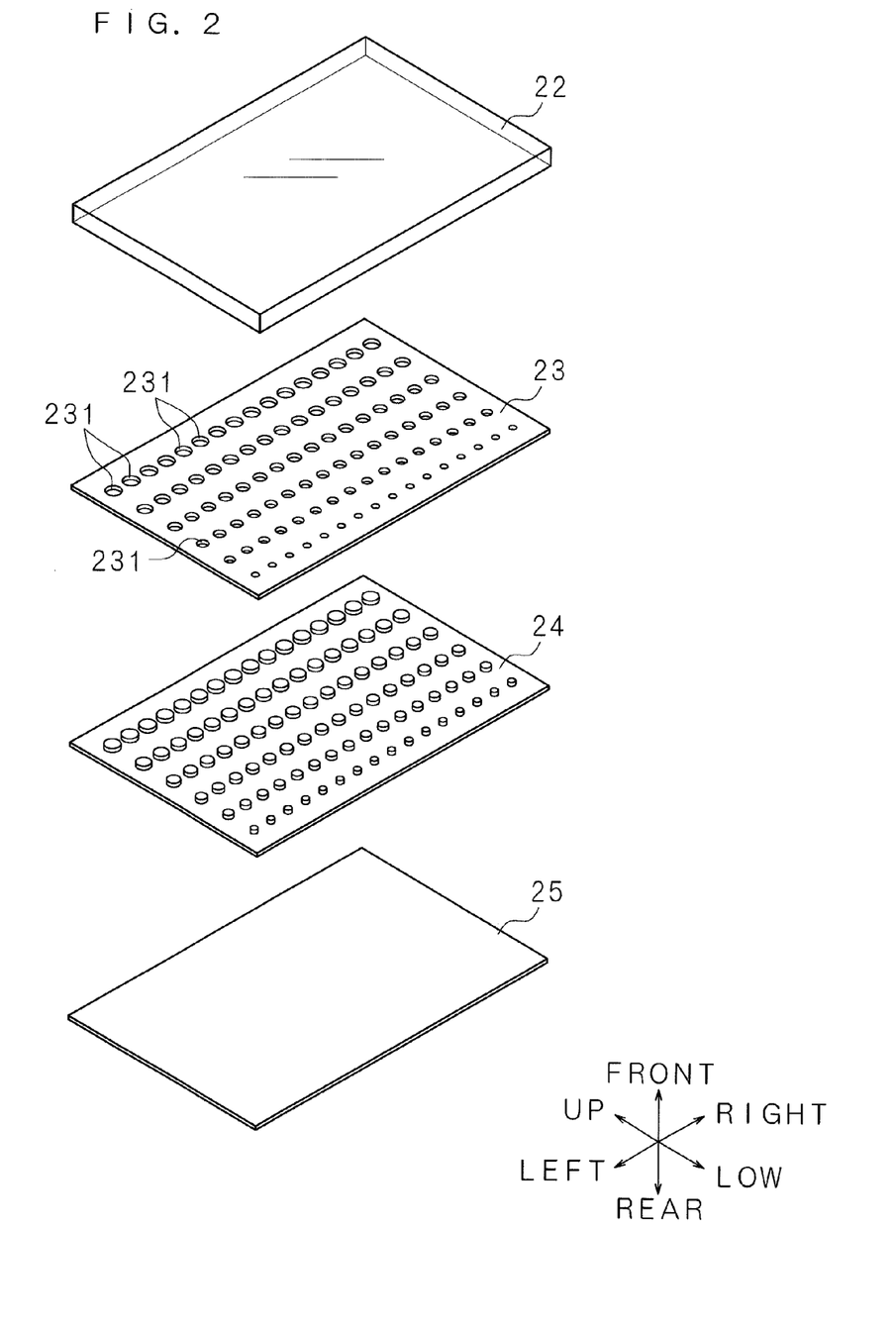
FIG. 2 is an exploded perspective view schematically illustrating the configuration of a backlight as a light source device according to Embodiment 1 of the present invention.
Figure 3:
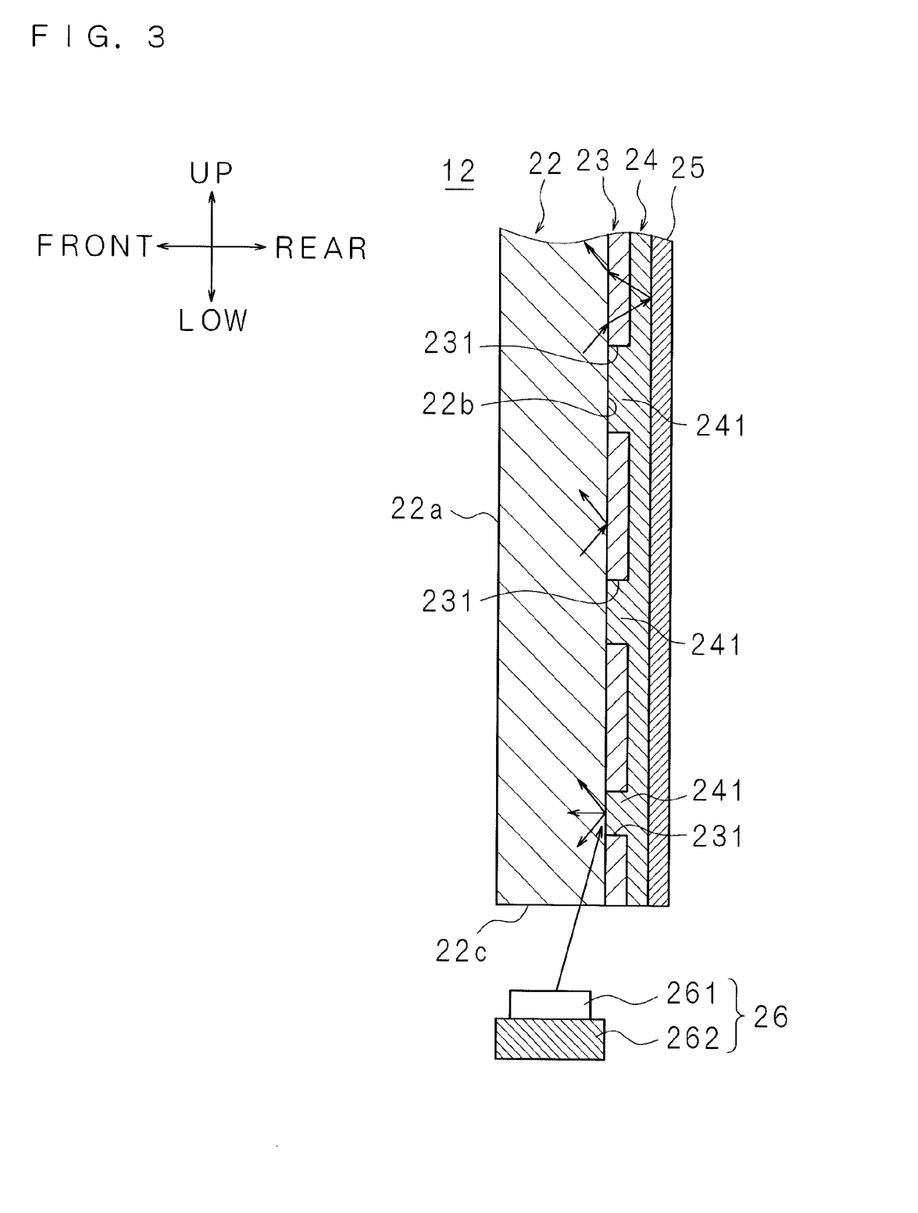
FIG. 3 is a longitudinal-sectional view schematically illustrating the configuration of the backlight.

FIGS. 2 and 3 are an exploded perspective view and a longitudinal-sectional view schematically illustrating the configuration of the backlight 12.

The backlight 12 includes an optical sheet group 21, a light guide plate 22, an optical layer 23, an adhesive layer 24, a reflection sheet 25, and a light source unit 26.

FIGS. 1 and 2 illustrates around a lower end part of the display panel 11. In FIG. 1, the optical layer 23 and the adhesive layer 24 are not illustrated. In FIGS. 2 and 3, the optical sheet group 21 is not illustrated. In FIG. 2, the light source unit 26 is also not illustrated.

First, each part of the display apparatus 1 will be described.

The display panel 11 uses a liquid crystal display panel. The display panel 11 is formed in a rectangular shape, and disposed in a vertical position. The display panel 11 has the rectangular display surface 11a on a front side. The display panel 11 has a glass substrate at the display surface 11a side (front side) and a glass substrate at a rear surface 11b side (back side). Liquid crystal is sealed between two glass substrates. Light transmittance of the display panel 11 is changed depending on a voltage applied to the liquid crystal of the display panel 11.

The backlight 12 is supported by the backlight chassis 13, a cabinet, and the like between the display panel 11 and the plate-shaped backlight chassis 13 which is disposed in a vertical position.

The optical sheet group 21 is formed by laminating a plurality of optical sheets each of which is formed in a rectangular shape. The optical sheet group 21 is disposed in close contact with a center part of the rear surface 11b of the display panel 11. The length of the optical sheet group 21 in each direction of horizontal and vertical directions is larger than the length of the display surface 11a of the display panel 11 in each direction of horizontal and vertical directions. The optical sheet group 21 covers the display surface 11a of the display panel 11 from the rear surface 11b side. Each optical sheet included in the optical sheet group 21 has a light diffusion function, a light collection function and the like.

The light guide plate 22 is formed in a rectangular plate shape. The light guide plate 22 may be made of an acrylic resin, for example. The light guide plate 22 has a refractive index n of about 1.5. The length of the light guide plate 22 in each direction of horizontal and vertical directions is larger than the length of the display panel 11 in each direction of horizontal and vertical directions. The length of the light guide plate 22 in each direction of horizontal and vertical directions is larger than the length of the optical sheet group 21 in each direction of horizontal and vertical directions.

A front surface (the other surface) 22a of the light guide plate 22 is disposed in close contact to the rear surface of the optical sheet group 21. In addition, the front surface 22a of the light guide plate 22 may be disposed to face the rear surface of the optical sheet group 21 apart therefrom at an appropriate length.

The heat sink 14 is disposed under the light guide plate 22. The heat sink 14 is supported by the backlight chassis 13. Heat conducted to the heat sink 14 is discharged to an outside of the display apparatus 1.

The light source unit 26 is disposed on an upper portion of the heat sink 14. The light source unit 26 includes a plurality of LEDs 261, 261, . . . (only one LED is illustrated in FIGS. 1 and 3, respectively), and an LED substrate 262.

The LED substrate 262 is formed in a laterally long rectangular shape.

The LEDs 261, 261, . . . are equidistantly mounted on an upper surface of the LED substrate 262 in a row in the lateral direction. The LEDs 261, 261, . . . and a lower end face 22c of the light guide plate 22 are oppositely disposed apart from each other at an appropriate length.

Heat emitted by the LEDs 261, 261, . . . is conducted to the heat sink 14 through the LED substrate 262.

The optical layer 23 is entirely formed (specifically printed) on a rear surface 22b of the light guide plate 22. The optical layer 23 has a lower light refractive index n than the light guide plate 22, which is about 1.2 to 1.3.

The optical layer 23 is provided with a plurality of openings 231, 231, . . . each of which is formed in a circular shape. The openings 231, 231, . . . are equally arranged in a plurality of columns in each of horizontal and vertical directions.

The inner diameter of each opening 231 positioned on an upper side is larger than the inner diameter of each opening 231 positioned on a lower side. In other words, the arrangement density of the openings 231, 231, . . . becomes lower toward the lower side (i.e., with becoming closer to the light source unit 26).

The adhesive layer 24 is entirely formed (for example, printed) at portions exposed from the openings 231, 231, . . . in the rear surface of the optical layer 23, and the rear surface 22b of the light guide plate 22. The adhesive layer 24 has light scattering properties. Therefore, the adhesive layer 24 is formed by mixing powdery material or granular material having light scattering properties with a translucent adhesive layer.

Hereinafter, the adhesive layer 24 filled in the openings 231, 231, . . . of the optical layer 23 is referred to as dot parts 241, 241, . . . . An appearance of the dot part 241 is equal to an inner shape of the opening 231.

The reflection sheet 25 is formed in a rectangular shape. The length of the reflection sheet 25 in each direction of horizontal and vertical directions is the length or more of the light guide plate 22 in each direction of horizontal and vertical directions. In the present embodiment, the length thereof in each direction of horizontal and vertical directions is approximately equal to each other.

The reflection sheet 25 is disposed in close contact to the rear surface of the adhesive layer 24, and entirely covers the rear surface of the light guide plate 22. The backlight chassis 13 is disposed on the rear side of the reflection sheet 25.

The dot parts 241, 241, . . . of the adhesive layer 24 are directly adhered to the light guide plate 22. The front surface of the adhesive layer 24 excluding the dot parts 241, 241, . . . is entirely adhered to the rear surface of the optical layer 23. The front surface of the optical layer 23 is entirely adhered to the rear surface of the light guide plate 22. The rear surface of the adhesive layer 24 is entirely adhered to the front surface of the reflection sheet 25.

In other words, the reflection sheet 25 is adhered on an entire surface of the rear surface 22b of the light guide plate 22 through the optical layer 23 and the adhesive layer 24. Therefore, peeling off of the reflection sheet 25 from the light guide plate 22 is suppressed.

Even when the optical layer 23 is not adhered to the light guide plate 22, since the rear surface of the adhesive layer 24 is entirely adhered to the reflection sheet 25, peeling off of the reflection sheet 25 is more suppressed than the case in which the reflection sheet is adhered to the light guide plate 22 through only the light scattering dots as the first surface light emitting device described in Japanese Patent Application Laid-Open No. 2013-93195.

As describe above, the light guide plate 22, the optical layer 23, the adhesive layer 24, and the reflection sheet 25 are integrally provided. Hereinafter, a group of the light guide plate 22, the optical layer 23, the adhesive layer 24, and the reflection sheet 25 is referred to as a light guide unit.

Next, illumination of the display panel 11 by the backlight 12 will be described.

Light emitted by the light source unit 26 is transmitted through the lower end face 22c of the light guide plate 22, and made incident inside of the light guide plate 22.

A part of the light incident inside of the light guide plate 22 is made incident to the front surface 22a thereof.

The light incident to the front surface 22a is emitted to an outside of the light guide plate 22 (a front side of the light guide plate 22) from the front surface 22a, or emitted to the back side.

The other part of the light incident inside of the light guide plate 22, or a part of the light reflected to the back side on the front surface 22a is made incident to the rear surface 22b.

A part of the light incident to the rear surface 22b is transmitted through the rear surface 22b and made incident to the dot part 241. The dot part 241 has light scattering properties. Therefore, the light incident to the dot part 241 is scattered to the front side. A part of the light scattered to the front side is made incident to the front surface 22a. Even if the light incident to the dot part 241 is transmitted through the dot part 241, at least a part of the light transmitted through the dot part 241 is reflected to the front side on the reflection sheet 25, and made incident to the front surface 22a.

A part of the light incident to the rear surface 22b is transmitted through the rear surface 22b and made incident to the optical layer 23. Since the optical layer 23 has a lower light refractive index than the light guide plate 22, the light is likely to be totally reflected on a boundary portion between the light guide plate 22 and the optical layer 23. Therefore, the light incident to the optical layer 23 is reflected to the front side. It would be more difficult for the light incident to the optical layer 23 to be transmitted through the optical layer 23 than the case in which the optical layer 23 has a refractive index or more of the light guide plate 22. Even if the light incident to the optical layer 23 is transmitted through the optical layer 23, at least a part of the light transmitting through the optical layer 23 is reflected to the front side on the reflection sheet 25, and made incident to the front surface 22a.

In this way, light emitted by the light source unit 26 is guided to the front side of the light guide plate 22. As a result, the light guide plate 22 performs a surface emitting.

Figure 4A:
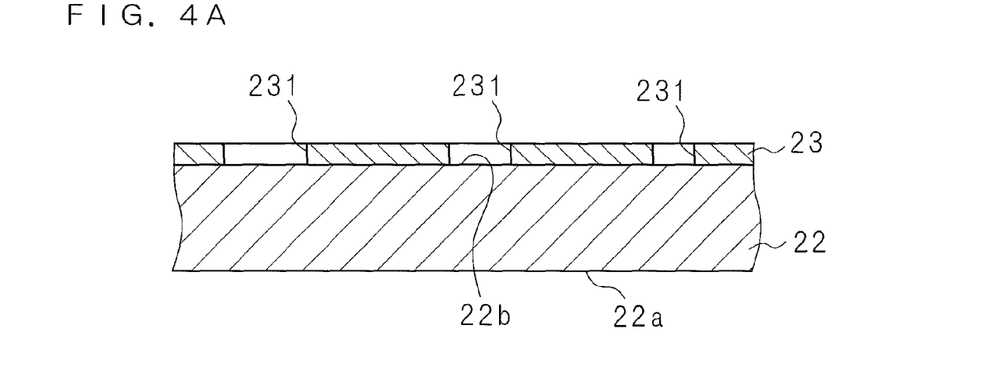
FIGS. 4A-4C are cross-sectional views describing a method of manufacturing the backlight.
Figure 4B:
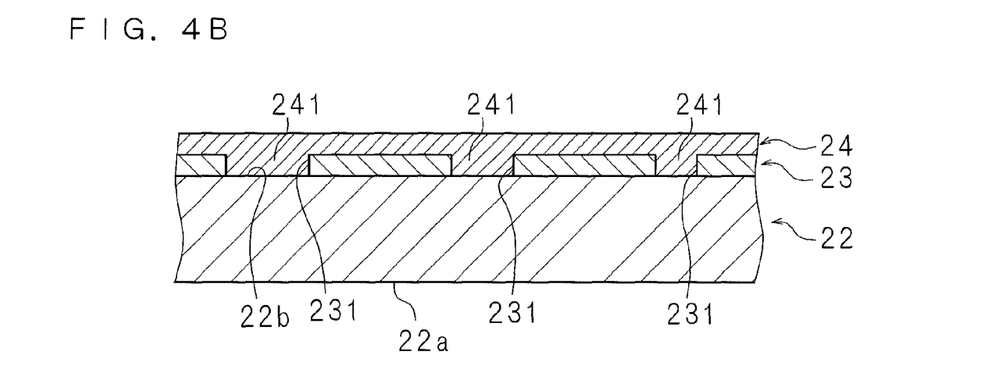
Figure 4C:
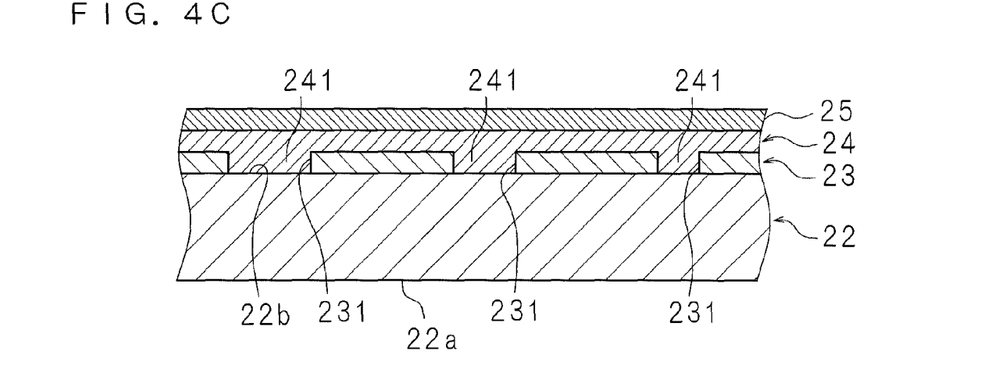

FIGS. 4A-4C are cross-sectional views describing a method of manufacturing the light guide unit of the backlight 12.

First, the optical layer 23 provided with the openings 231, 231, . . . is printed on the rear surface 22b of the light guide plate 22 by a worker (see FIG. 4A).

In the case of screen printing, a screen plate used for printing the optical layer 23 is a plate in which the negative-positive regions of the conventional screen plate used for printing the light scattering dots are reversed.

Then, by the worker, the adhesive layer 24 is formed on the rear surface of the optical layer 23 and the rear surface 22b of the light guide plate 22 which is exposed from the openings 231, 231, . . . of the optical layer 23. For this, an adhesive having light scattering properties (for example, a translucent adhesive mixed with powdery material or granular material having light scattering properties) is used. The adhesive layer 24 may be formed by printing using an adhesive having light scattering properties, applying the adhesive having light scattering properties or the like. At this time, the adhesive layer 24 is naturally filled in each of the openings 231, 231, . . . , so as to become the dot parts 241, 241, . . . (see FIG. 4B).

Next, the front surface of the reflection sheet 25 is come into close contact to the rear surface of the adhesive layer 24 by the worker. Then, the reflection sheet 25 is adhered to the light guide plate 22 through the optical layer 23 and the adhesive layer 24 (see FIG. 4C).

Each dot part 241 is filled in the opening 231 of the optical layer 23. If an air layer is present around the dot part 241, when the dot part 241 is sandwiched between the light guide plate 22 and the reflection sheet 25, the dot part 241 may be distorted by being expanded or falling in the surface direction of the light guide plate 22. However, in the dot part 241 filled in the opening 231 of the optical layer 23, an occurrence of the distortion is suppressed.

In addition, as compared to the conventional light scattering dots, the optical layer 23 has a large area. Therefore, distortion of the optical layer 23 generated during forming the same (distortion of a peripheral edge part of each opening 231) is negligibly small compared to the distortion of the light scattering dots generated during forming the same. Since distortion of the peripheral edge part of each opening 231 is suppressed, distortion of the dot part 241 is also suppressed. The reason is that the shape of each dot part 241 corresponds to the peripheral edge shape of the opening 231 in which the dot part 241 is filled.

By the worker, the optical sheet group 21 is disposed on the back side of the display panel 11, the light guide unit is disposed on the back side of the optical sheet group 21, and the light source unit 26 is mounted on the heat sink 14, and then, the heat sink 14 is mounted on the backlight chassis 13, after that, the backlight chassis 13 is disposed so that the LEDs 261, 261, . . . of the light source unit 26 face the lower end face 22c of the light guide plate 22, thereby the display apparatus 1 is formed. At this time, the backlight 12 is also formed.

In the backlight 12 formed as described above, the surface emitting of the guide plate 22 is uniform.

The reason is that, since the reflection sheet 25 is entirely adhered to the light guide plate 22, and deflection of the reflection sheet 25 due to thermal expansion is suppressed, an occurrence of luminance unevenness caused by the deflection of the reflection sheet 25 is also suppressed. Further, the reason is that, since the distortion of each of the dot parts 241, 241, . . . is suppressed, an occurrence of luminance unevenness caused by the distortion of the dot parts 241, 241, . . . is also suppressed. Furthermore, the reason is also that, since the optical layer 23 and the adhesive layer 24 play a role of a spacer between the light guide plate 22 and the reflection sheet 25, the spaced distance between the rear surface 22b of the light guide plate 22 and the front surface of the reflection sheet 25 is constant.

In addition, light-guiding efficiency of the light guide plate 22 to the front side is high. The reason is that, since the dot part 241 has light scattering properties, as well as the light is likely to be totally reflected on the boundary portion between the light guide plate 22 and the optical layer 23, the amount of light transmitting through the dot part 241 or the optical layer 23 and made incident to the reflection sheet 25 is minimized. If the amount of light incident to the reflection sheet 25 is large, the amount of light decayed without being guided to the front side of the light guide plate 22 is increased, such that the light-guiding efficiency is deteriorated.

The light guided to the front side of the light guide plate 22 is made incident inside of the display panel 11 through diffusion, light collection, or the like by the optical sheet group 21. The light incident inside of the display panel 11 is transmitted through the display panel 11, or prevented from being passed through the display panel 11. As a result, an image is displayed on the display surface 11a.

Since the surface emitting of the light guide plate 22 is uniform, the display surface 11a of the display panel 11 is uniformly bright. Therefore, the display quality of the display apparatus 1 can be improved.

Further, the adhesive layer 24 may have light reflecting properties, instead of the light scattering properties. In this case, the light incident to the dot part 241 is reflected to the front side. Briefly, if the adhesive layer 24 has the light scattering properties or has the light reflecting properties, there is no particular problem, and the light incident inside of the light guide plate 22 can be guided to the front side.

In addition, the optical layer 23 is not limited to the configuration of being formed by printing. Further, it is not limited to the configuration in which the optical layer 23 is directly formed. For example, by the worker, a lower refractive index layer to be the optical layer 23 is formed on the rear surface 22b of the light guide plate 22 by applying a low refractive index material, by depositing, sputtering, or the like, and the formed low refractive index layer is subjected to etching, such that the optical layer 23 provided with the openings 231, 231, . . . may be formed.

Embodiment 2

Figure 5:
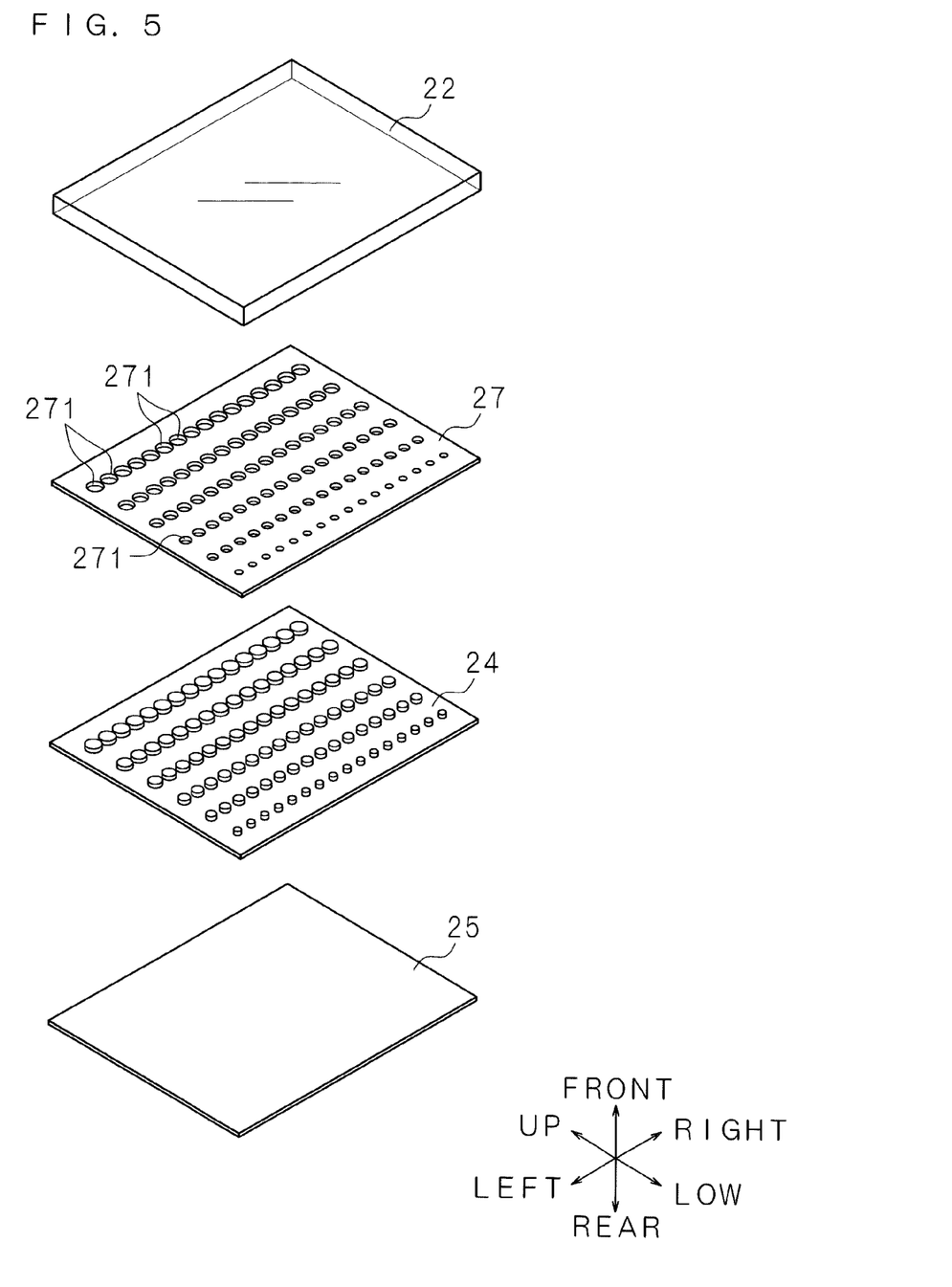
FIG. 5 is an exploded perspective view schematically illustrating the configuration of a backlight as a light source device according to Embodiment 2 of the present invention.
Figure 6:
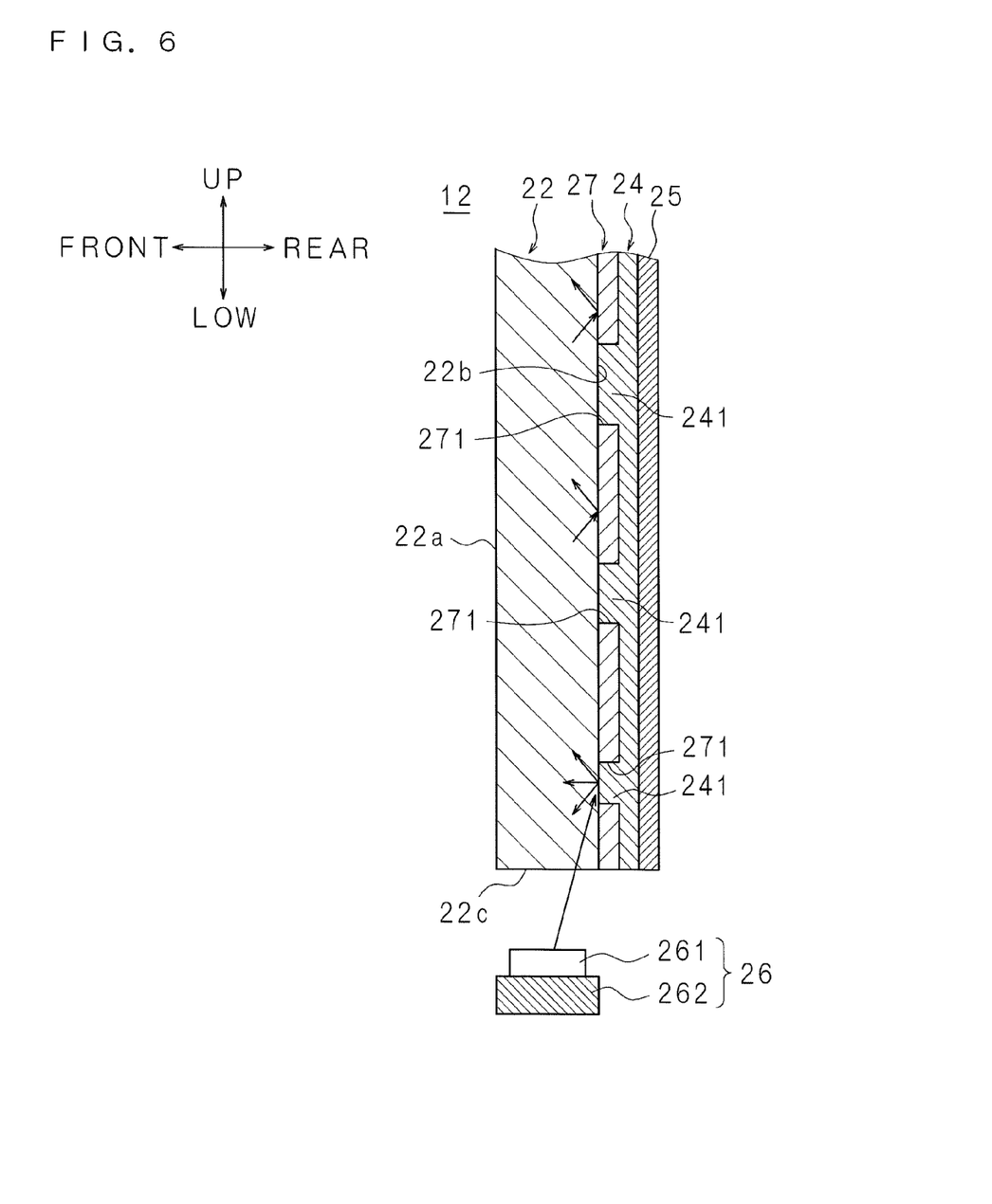
FIG. 6 is a longitudinal-sectional view schematically illustrating the configuration of the backlight.

FIGS. 5 and 6 are an exploded perspective and a longitudinal-sectional view schematically illustrating the configuration of the backlight 12 as the light source device according to Embodiment 2 of the present invention.

A display apparatus 1 of the present embodiment includes a backlight 12 of the present embodiment, instead of the backlight 12 of the Embodiment 1. The backlight 12 of the present embodiment has substantially the same configuration as the backlight 12 of Embodiment 1. Hereinafter, a difference from Embodiment 1 will be described, and other parts corresponding with Embodiment 1 have the same reference numbers, and will not be described in detail.

The backlight 12 of the present embodiment includes an optical layer 27 which has light reflecting properties and is provided with a plurality of openings 271, 271, . . . , instead of the optical layer 23.

Preferably, the optical layer 27 has reflecting properties for totally reflecting. In this case, light is not transmitted through the optical layer 27. Therefore, it is possible to improve the light-guiding efficiency of the light guide plate 22 to the front side, compared to the case of providing the optical layer 23.

Further, the optical layer 27 may have reflecting properties for partially reflecting. In this case, light may be transmitted through the optical layer 27. Thereby, it is possible to obtain the light-guiding efficiency approximately equal to the case of providing the optical layer 23.

In addition, the optical layer 27 may have light scattering properties instead of the light reflecting properties. In this case, the light incident to the optical layer 27 is scattered to the front side. Briefly, if the optical layer 27 has the light scattering properties or has the light reflecting properties, there is no particular problem, and the light incident inside of the light guide plate 22 can be guided to the front side.

In the backlight 12 and the display apparatus 1 configured as described above, it is possible to obtain the same effects as the backlight 12 and the display apparatus 1 of Embodiment 1.

The light source device according to the present embodiment of the present invention is not limited to such the backlight 12 incorporated in the display apparatus 1. For example, the light source device may be configured as a backlight of the display unit provided in mobile phones, portable information communication terminals or the like. Alternately, the light source device may be configured as a ceiling light, a wall mounted lighting device or the like. When configuring as the ceiling light, for example, the light guide plate may be disposed in a horizontal position.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

In addition, as long as having the effects of the present invention, components which are not disclosed in Embodiments 1 and 2 may be included in the backlight 12 or the display apparatus 1.

Components (technical characteristics) disclosed in each embodiment may be combined with each other, and by combining these components new technical characteristics may be formed.

The invention claimed is:

1. A light source device, comprising:
    a reflection sheet having light reflecting properties;
    a light guide plate in which the reflection sheet is disposed on a side of one surface thereof and which is configured to emit light emitted by a light source unit from a front surface thereof;
    an optical layer which is formed on the one surface, provided with openings, and configured to guide the light incident on the one surface to a side of the front surface, wherein the optical layer has a lower light refractive index than the light guide plate; and
    an adhesive layer which is formed on a rear surface of the optical layer and the one surface which is exposed from the openings, and has light scattering properties or light reflecting properties,
    wherein the reflection sheet is adhered to the light guide plate through the adhesive layer.

2. The light source device according to claim 1, wherein the optical layer has light reflecting properties.

3. The light source device according to claim 1, wherein each of the openings is formed in a circular shape, and an inner diameter of opening positioned on a distal side of the light source unit is larger than an inner diameter of opening positioned on a proximal side of the light source.

4. A display apparatus, comprising:
    the light source device according to claim 1; and
    a display panel which is illuminated from a back side thereof by the light source device.

5. The light source device according to claim 1, wherein the adhesive layer is filled in the openings of the optical layer.

6. The light source device according to claim 1, wherein the light source unit is oppositely disposed apart from an end face of the light guide plate.

7. The light source device according to claim 1, wherein the light source unit comprises an LED and a substrate.

8. The light source device according to claim 1, wherein the light source unit is disposed on a heat sink.

9. A method of manufacturing the light source device which includes a reflection sheet having light reflecting properties, and a light guide plate in which the reflection sheet is disposed on a side of one surface thereof and which is configured to emit light emitted by a light source unit from a front surface thereof, comprising the processes of:
    forming an optical layer, which is provided with openings, and configured to guide the light incident on the one surface to a side of the front surface, on the one surface;
    forming an adhesive layer, which has light scattering properties or light reflecting properties, on a rear surface of the optical layer and the one surface which is exposed from the openings; and
    adhering the reflection sheet to the light guide plate through the adhesive layer,
    wherein the optical layer has a lower light refractive index than the light guide plate.

10. The method of manufacturing the light source device according to claim 9, wherein the optical layer is formed by printing.

* * * * *